United States Patent [19]
Lehto

[11] Patent Number: 5,194,083
[45] Date of Patent: Mar. 16, 1993

[54] METHOD AND APPARATUS FOR BENDING A GLASS SHEET

[75] Inventor: Esko O. Lehto, Kangasala, Finland

[73] Assignee: Tamglass Engineering Oy, Tampere, Finland

[21] Appl. No.: 761,471

[22] Filed: Sep. 18, 1991

[30] Foreign Application Priority Data

Sep. 21, 1990 [FI] Finland ................................. 904653

[51] Int. Cl.⁵ ........................................ C03B 23/025
[52] U.S. Cl. .......................................... 65/107; 65/29; 65/160; 65/162; 65/273
[58] Field of Search .................. 65/107, 162, 268, 273, 65/287, 289, 29, 160

[56] References Cited

U.S. PATENT DOCUMENTS

| | | | |
|---|---|---|---|
| 2,794,300 | 6/1957 | Golightly | 65/107 |
| 3,457,060 | 7/1969 | Leflet et al. | |
| 3,744,985 | 7/1973 | Peternel | |
| 4,229,201 | 10/1980 | Comperatore et al. | 65/287 |
| 4,952,227 | 8/1990 | Herrington et al. | 65/162 |

FOREIGN PATENT DOCUMENTS

| | | |
|---|---|---|
| 0078135 | 10/1982 | European Pat. Off. |
| 370310 | 5/1990 | European Pat. Off. |
| 0376509 | 7/1990 | European Pat. Off. |
| 443948 | 2/1991 | European Pat. Off. |
| 1098679 | 9/1959 | Fed. Rep. of Germany |
| 57395 | 7/1974 | Finland |
| 82235 | 4/1987 | Finland |
| 436196 | 10/1981 | Sweden |
| 1035512 | 1/1963 | United Kingdom |

Primary Examiner—Joye L. Woodard
Attorney, Agent, or Firm—Burns, Doane, Swecker & Mathis

[57] ABSTRACT

The invention relates to a method and apparatus for bending a glass sheet. A glass sheet (5) is supported on a bending mould (6) in a heating furnace and heated close to a softening temperature by means of a heating field generated by heating elements (4). Glass sheet (5) is placed adjacent to the heating field whose energy distribution is adjusted as desired. Glass sheet (5) is controllably pulled away from the heating field as the glass heats up and begins to bend.

17 Claims, 4 Drawing Sheets

METHOD AND APPARATUS FOR BENDING A GLASS SHEET

BACKGROUND

The present invention relates to a method for bending a glass sheet, wherein a glass sheet is supported on a bending mould in a heating furnace and heated close to a softening temperature by means of a heating field generated by heating element. The invention relates also to an apparatus for bending a glass sheet, said apparatus comprising a heating furnace, a mould for supporting a glass sheet in the heating furnace, as well as an array of heating elements for generating a heating field. The heating elements are typically elongated electric resistance elements, the invention not being limited, however, to the use of such elements only but also other types of heating elements, such as gas burners can be employed.

The prior art methods and equipment, based on gravitational bending of glass, can only be used for bending relatively simple configurations. Complex bending shapes, wherein the bending is effected with a relatively small bending radius and often also about two crosswise bending axes, have necessarily been bent by embossing between whole-surface moulds. This requires inconvenient and expensive mould technology, wherein a further problem is a contact between mould and glass.

One of the most important qualities in a heating furnace is the proper focusing of heat in terms of both quantity and timing. With the prior art methods and equipment, it is difficult or impossible to achieve the properly proportioned and timed focusing of heat as a result of e.g. the following reasons:

distance between glass and heating resistances is too long distance between glass and heating resistances cannot be adjusted during a bending operation mutual distance of heating resistances is too long parallel heating resistances are not capable of focusing heat on a desired spot measuring often involves just overall temperature, although a bending process should be controlled on the basis of glass temperature the heat radiation energy emitted by an individual heating resistance is not correctly dimensioned.

OBJECTS OF THE INVENTION

An object of the invention is to provide an improved method and apparatus for eliminating the above deficiencies as completely as possible in a manner that the heating effect can be applied to glass by focusing as correctly as possible locally, quantitatively, and in terms of timing.

This object is achieved on the basis of the characterizing features set forth in the annexed claims.

As the invention makes it possible to control the focusing of heat on glass, the glass can be subjected to bending relative complex bending shapes therein even by mere gravitational bending with the glass supported on a ring mould. If particularly difficult bending shapes are required, it is of course possible to employ whole or partial surface moulds on one or either side of a glass sheet. Examples of such moulds are disclosed in the Applicant's prior FI Patent applications 901601, 901602 and 901603. When applying these mould designs, the use of an upper mould shall not be necessary until at the end of a bending operation for continued bending and finishing the shape.

Although the invention shall be described in association with an individual separate furnace, it is obvious that the invention is applicable also in connection with current bending furnaces to replace their bending station, serving as an extension of the actual heating furnace or a special section included therein.

BRIEF DESCRIPTION OF THE DRAWINGS

One embodiment of the invention will now be described in more detail with reference made to the accompanying drawings, in which.

DESCRIPTION

Figure 1:
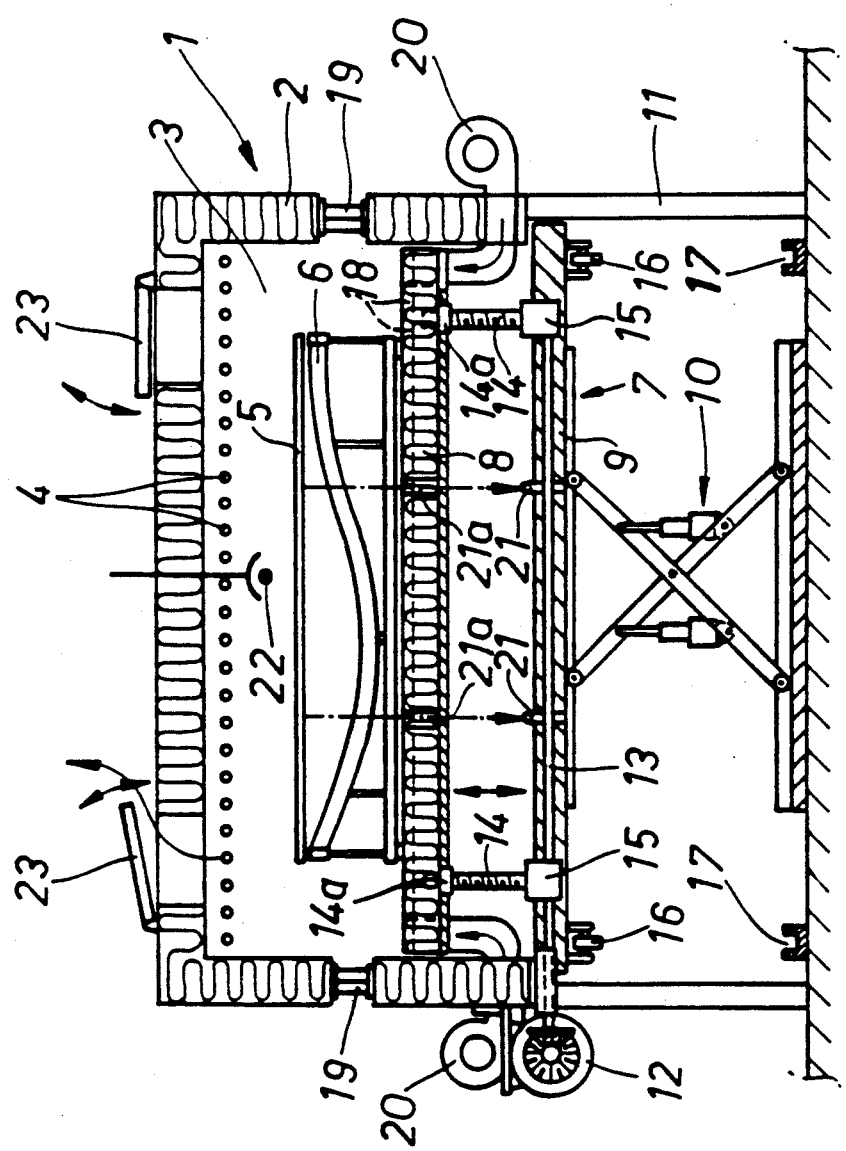
FIG. 1 shows an apparatus of the invention in a schematic vertical section.

Next described will be the general design of the apparatus. A bending furnace indicated by reference numeral 1 is fixedly mounted on a flat base and supported by legs 11. The furnace includes walls 2 which are provided with a solid external steel frame carrying an internal heat insulation. The top section of a furnace space 3 is provided with a plurality of densely mounted elongated resistance heating elements 4, whose more detailed arrangement will be explained hereinafter with reference to FIG. 4.

A glass sheet 5 subjected to bending is supported on a mould 6, which can be a ring mould, a whole-surface mould or a combination of a ring mould and a partial-surface mould.

A base carriage 7 is shown in its hoisted position with its heat-insulated floor 8 in furnace space 3 and a lower floor 9, providing the body of a base carriage, resting tightly against the bottom edges of furnace walls 2. A hoist 10 can be used for lifting and lowering the entire carriage 7, so that in a top position said floor 9 is positioned as shown in FIG. 1 and in a bottom position, wheels 16 are in contact with rails 17 for pushing said base carriage 7 along with its mould and glass out of the furnace (see FIG. 2, stage a).

The movable floor 8 facilitates adjustment of the distance of glass 5 from resistances 4. A drive shaft 13 rotated by a power unit 12 rotates lifting screws 14, which are engaged with lifting nuts 14a carried by floor 8. The rotation of screws 14 is effected by means of gear or worm screw drives included in housings 15. Housings 15 are secured to floor 9 and the lower ends of screws 14 are journalled against the base of housings 15 and the upper ends are allowed to extend through floor 8. Of course, the opposite arrangement is also possible, whereby the upper ends of screws 14 are journalled to floor 8 in a rotatable but axially fixed manner and the screw rod extends through housing 15. Lifting screws 14 can also be replaced by gear racks or other prior known hoisting means. Two drive shafts 13 are required at both ends of a furnace, the number of lifting screws 14 thus being four. In order to provide a stepless adjustment for the traveling speed of floor 8 as well as for the distance of glass sheet 5 from resistances 4, said driving unit 12 comprises one of the following: a hydraulic variator, a direct-current motor, a servo motor or a stepping motor. On the other hand, said power unit 12 is operated by means of a bending-process controlling computer 26 (FIG. 2), as explained in more detail hereinafter.

In view of measuring the temperature, said floor 9 of carriage 7 is provided with two infrared thermometers (pyrometers) 21 for measuring the real glass temperature directly from the glass surface. For this purpose, said movable floor 8 is provided with openings 21a. In addition, said furnace 3 is provided with a thermoelement 22 for measuring the general furnace temperature.

In order to obtain a desired and controlled cooling rate for glass following a bending operation, there are two cooling-air fans 20 adapted to blast cooling air through passages or recesses in the edges of floor 8. Fans 20 can be mounted either on the lower edge of furnace wall 2, as shown in FIG. 1, or also on floor plate 9 of carriage 7. The rotating speed of fans 20 is adjustable in a stepless fashion. In addition, the roof of furnace 1 is provided e.g. in four corners with openable and closeable cooling gates 23 for letting hot air out of the furnace. Gates 23 are each subjected to individual control for attaining a desired cooling rate.

Figure 2A:
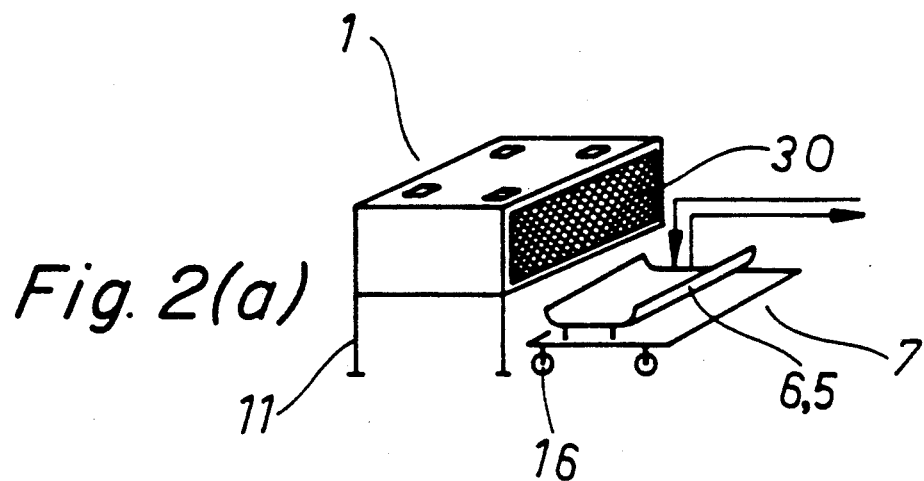
FIG. 2 is a schematic view of the various operating stages a), b) and c) for the apparatus.
Figure 2B:
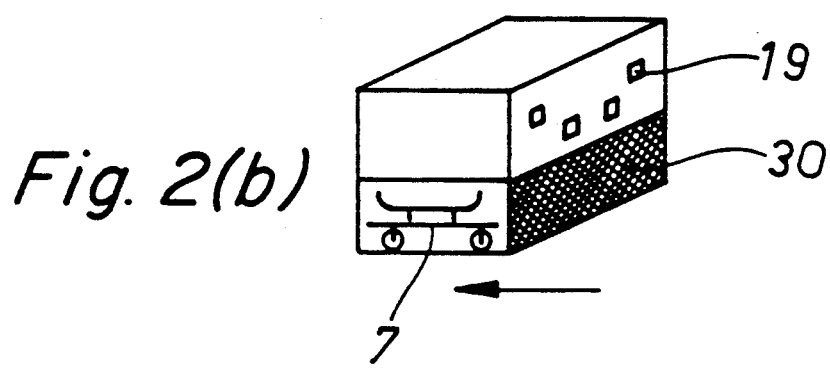
Figure 2C:
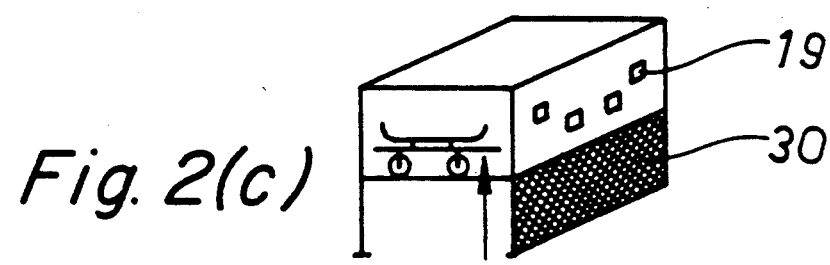

The bending furnace is provided on all four sides with windows 19 which offer a good visibility to the furnace interior. The furnace is also fitted with an effective illuminator providing a good visibility inside the furnace even in its cold condition (during a bending operation, the hot-glowing resistances also add to visibility). The spaces between furnace legs 11 can be provided with protective walls in order to avoid possible damages caused by a movable base carriage and a hoist mechanism included in the furnace. One of the protective walls, indicated by reference numeral 30 in FIG. 2, is movable up and down along guideswhereby, in the top position of protective wall 30, said base carriage 7 can be pulled out for loading or unloading (FIG. 2, stage a)) and, in the bottom position of wall 30, the lower section of the furnace is completely protected.

Figure 3:
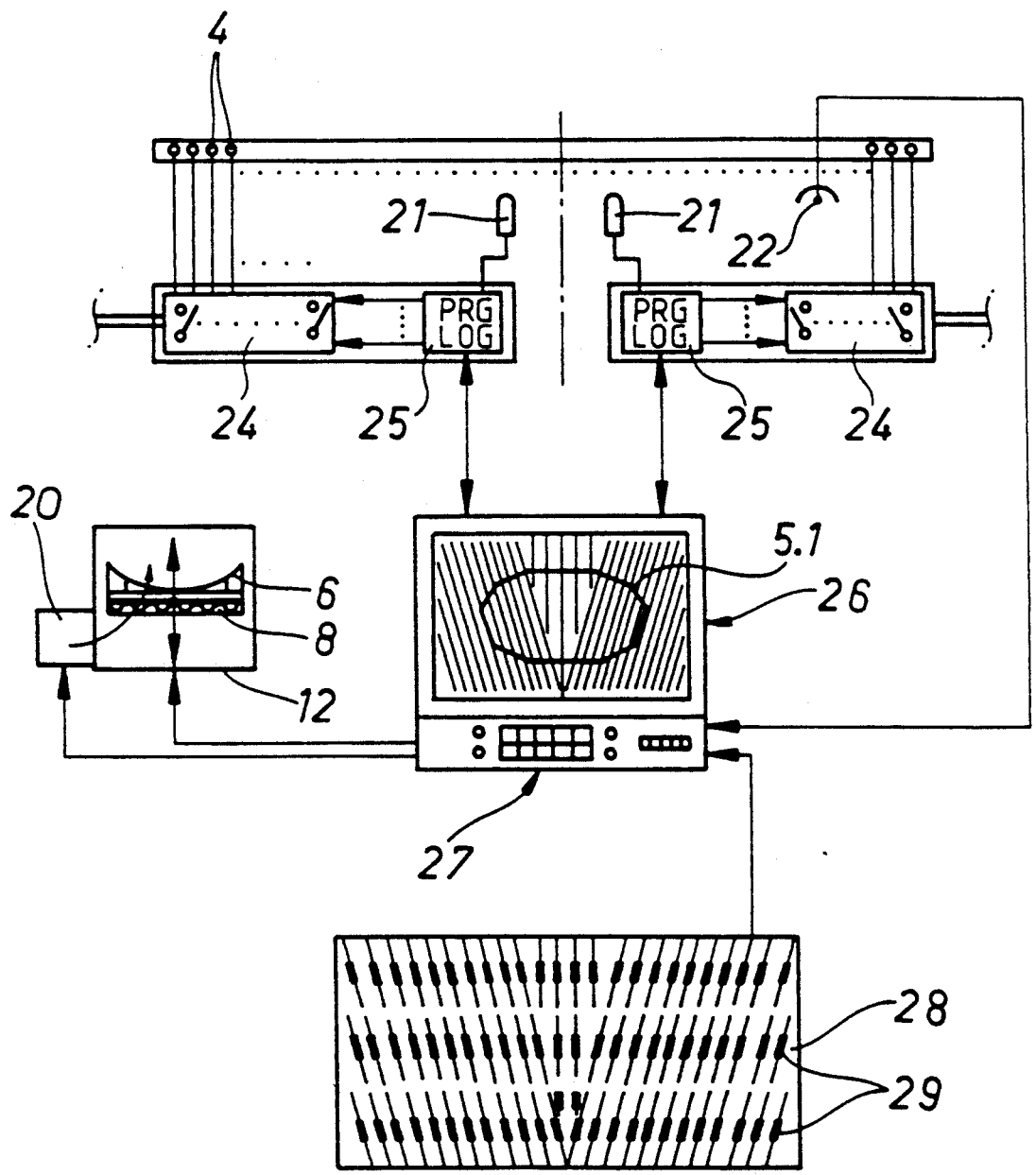
FIG. 3 is a block diagram showing the operating control for a method and apparatus of the invention.
Figure 4:
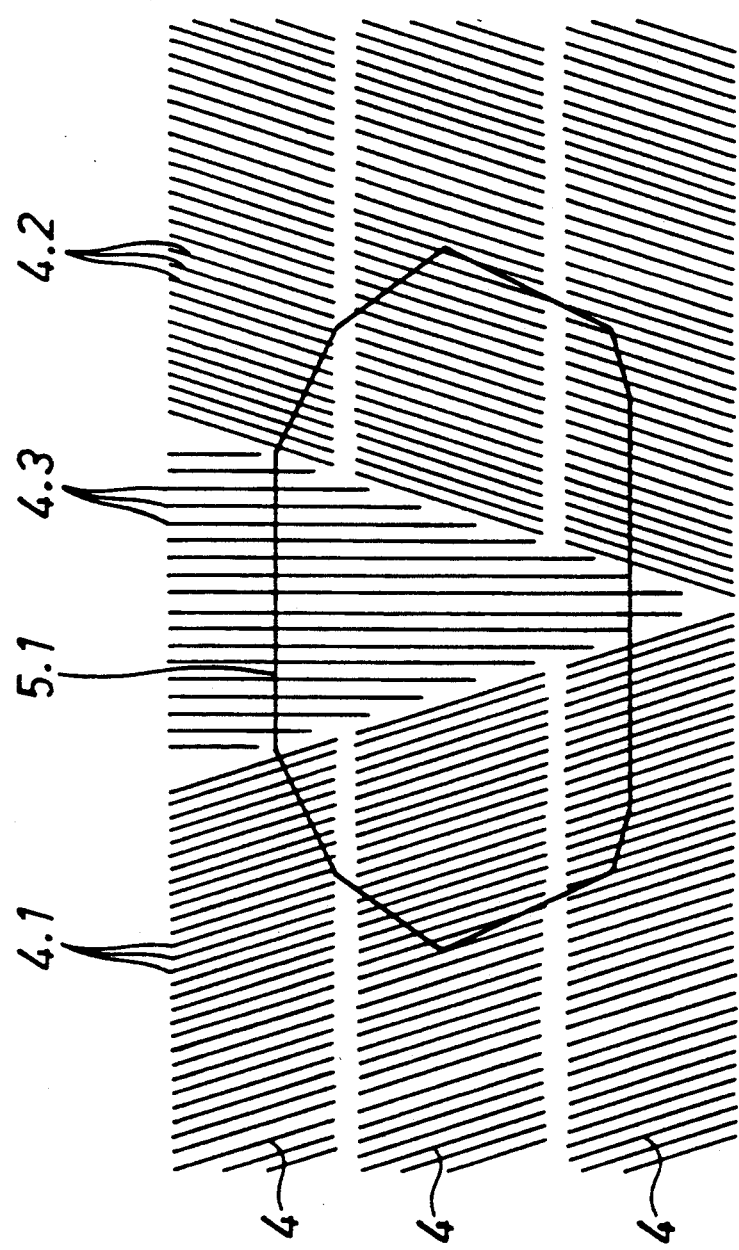
FIG. 4 is a more detailed view of the arrangement of resistances for a heating field.

FIGS. 3 and 4 illustrate the operating control and arrangement of resistances. As shown particularly in FIG. 4, elongated heating resistance elements 4.1 and 4.2 are symmetrically positioned in two half-fields in a manner that the longitudinal direction of elements 4.1 forms an acute angle with that of elements 4.2. Between these resistance fields is yet a third resistance field, the direction of resistances 4.3 therein being crosswise or longitudinal relative to the longitudinal direction of the furnace. The array of these mid-section resistances 4.3 need not be so dense, since sufficient heating effect travels from the edges towards the centre and relatively the more the further away from the resistance field a glass sheet is located.

In addition, the resistance line provided by each resistance 4.1 and 4.2 is of ternary configuration, i.e. three resistance that can be separately switched on and off are mounted on a common line one after the other. The power dimensioning and arrangement of resistances 4.1 and 4.2 and 4.3 are carried out in a manner that the heating effect thereof can be focused in the best possible degree on a desired spot for a controlled bending operation. This object is not only achieved by the large number and density of resistances but also, and in particular, the V-shaped relative disposition of resistances 4.1 and 4.2. The V-angle must be typically within the range of 20°-50°, preferably 30°-40°, e.g. 35°. The total number of individual resistances that can be separately switched on and off is over 200, preferably over 300, e.g. 350.

In FIG. 3, reference numeral 24 designates a block, which houses e.g. relay-controlled switches or contactors, one for each resistance 4. The control of switches or contactors 24 is effected by means of controllable logic circuits 25, which read the ON/OFF-states of individual resistances 4 and which inform a process-controlling computer 26 of a given circuit pattern in the resistance field. This is shown on the display of computer 26 e.g. by variation of the colour of switched-on resistances. Thus, the display includes a graphic representation according to FIG. 4 over the entire resistance field in a manner that each resistance is visible.

On top of this resistance field, it is possible to display an outline 5.1 for a glass sheet to be bent, whereby the experimental set-up of a bending program for each bending shape and glass thickness separately is considerably facilitated.

For an experimental search of bending parameters, the apparatus is further provided with a control panel 28 which carries a schematic drawing of the arrangement of resistances and each resistance is individually numbered. Aligned with each resistance are switches 29 for switching individual resistances on and off. Thus, the control panel 28 can be to manually set up any desired heating pattern. A signal light is switched on control panel 8 from each switched-on resistance. The ON/OFF-positions of switches 29 and the variation thereof during various stages of a heating and bending cycle can be recorded in the program store of computer 26. Thus, the manually controlled energy distribution of a heating field and the changing thereof can be programmably reproduced. The power unit 12 for lifting and lowering said floor 8 can be controlled either from an operating panel 27 manually or by repeating the previous manual control, which is recorded in the program store of computer 26. One useful computer program is e.g. designated "Screen Ware", which is commercially available control-room software for PC/AT micro-computers. This program includes an appropriate flexible configuration of displays, data logging and processing as well as real-time displays. This program can be directly linked with programmable logic circuits 25. In the test apparatus, the computer 26 comprises Nematron IWS-4000 industrial micro-computer, whose mass storage is an industrial hard disc with facilities of recording over 1000 glass-bending programs. The operation of cooling fans 20 can also be adapted to be controlled by computer 26. The display of computer 26 can of course be used to optionally illustrate most versatile bending-related parameters by means of various column diagrams and symbols. Such parameters include e.g. glass and furnace temperatures, furnace heating capacity, vertical position and traveling speed of floor 8, position of roof gates 23, operating condition of fans etc.

Described next is an example of the events during a heating and bending cycle.

A glass sheet 5 is placed on a mould 6 mounted upon a carriage 7 brought out of a furnace. Carriage 7 is shifted to a position below the furnace and a protective wall 30 is lowered (FIG. 2, stage b)). Carriage 7 is lifted by means of a hoist 10 to its upper position (FIG. 1) and a desired bending program is selected, whereby:
gates 23 in the roof of a furnace are closed
a desired resistance configuration is switched on
movable floor 8 rises to a position required by the program according to the rise of temperature, the program automatically switches heating resistances on or off and also adjusts the distance of glass 5 from resistances 4 program logic circuits 25 have been provided with set values for final glass temperature and pyrometers 21 monitor the glass temperature. Upon reaching the final glass temperature, heating is cut off and a cooling cycle commences.

a desired cooling rate is attained by:
1) controlling the number of opened gates and their degree of opening,
2) controlling the speed of cooling fans 20 and
3) opening a fixed floor 9 off of the lower edge of walls 2.

An essential feature in the invention is the fact that the energy distribution of a resistance field can be adjusted during a heating and bending cycle by varying it in a desired manner locally, in terms of timing and quantitatively. Thus, the heating effect can be initially focused on those bending lines which require sharp bends or a bending about two criss-crossing axes. These zones are typically adjacent to the edges of a glass sheet. However, the bending lines are not parallel, nor is the glass sheet rectangular. Nevertheless, the V-shaped arrangement of resistances 4.1 and 4.2 facilitates a correct focusing of heating effect. At the start of a bending cycle, with the glass sheet close to a heating field, the energy flux density of a midfield section is adjusted to be substantially less than that of the fringe zones. Thus, the glass sheat is heated and is first subjected to more vigorous bending adjacent to its fringe areas, which also require the most significant deformations (flexure and elongation). At the start of a bending cycle, the colder mid-section of the glass sheet not yet bent at least to a substantial degree but its weight assists in the bending of fringe areas. As the glass sheet is pullled away from a resistance field, a proportionally greater share of radiation heat is allowed to focus also on the mid-section of the glass sheet whereby, at the end of a bending cycle, the glass sheet is bent to a required curvature also over its mid-section. Also, when using a ring mould, it is possible to employ beneath the mid-section of the glass sheet e.g. spot-like supports, which define an accurate bending configuration for glass sheets.

Naturally, the invention is not limited to the above-discussed embodiment but a method of the invention can be applied in association with most varying glass-bending furnaces within the scope of the annexed claims.

I claim:

1. A method for bending a glass sheet comprising the steps of:
   supporting a glass sheet on a bending mould in a heating furnace;
   heating said glass sheet to a softening temperature with a heating field generated by heating elements;
   adjusting said heating field so as to provide a desired energy flux distribution over said heating field; and,
   moving said glass sheet away from said heating field as said glass begins to bend.

2. A method as set forth in claim 1, wherein said heating elements are electric resistance elements and said energy flux distribution is obtained by selectively switching said resistance elements between an on and off condition, and wherein said glass is moved by lowering said bending mould downwardly as the glass begins to bend.

3. A method as set forth in claim 2, wherein said step of adjusting said heating field and said step of moving said glass sheet are controlled according to a predetermined program.

4. A method as set forth in claim 3, wherein parameters for said predetermined program are separately determined for a range of glass shapes and a range of glass thicknesses and then stored in a memory of a bending-process controlling computer.

5. A method as set forth in claim 1, wherein said heating field is initially adjusted to provide an energy flux density at a mid-field section of said glass sheet that is less than an energy flux density of fringe areas of said glass sheet such that the glass sheet first bends around said fringe areas, and wherein, as said glass sheet is moved away from said heating field, said field is adjusted to increase said energy flux density at said mid-field section of said glass sheet such that said glass sheet bends over said mid-field section.

6. A method for bending a glass sheet comprising the steps of:
   supporting a glass sheet on a bending mould in a heating furnace;
   heating said glass sheet to a softening temperature with a heating field generated by heating elements, said field being adjustable to provide a desired energy flux distribution over said heating field; and,
   adjusting an energy flux distribution at localized regions of said heating field during bending of said glass sheet and adjusting a distance between said glass sheet and said heating field during bending according to a predetermined program such that, during bending, a heat-transfer effect between said heating field and said glass sheet is different at a localized region on said glass sheet that at other regions on said glass sheet.

7. A method as set forth in claim 6, wherein said heating elements are electric resistance elements and said energy flux distribution is obtained by selectively switching said resistance elements between an on and off condition, and wherein said glass is moved by lowering said bending mould downwardly as the glass begins to bend.

8. A method as set forth in claim 6, wherein said heating field is initially adjusted to provide an energy flux density at a mid-field section of said glass sheet that is less than an energy flux density of range areas of said glass sheet such that the glass sheet first bends around said bring areas, and wherein, as said glass sheet is moved away from said heating field, said field is adjusted to increase said energy flux density at said mid-field section of said glass sheet such that said glass sheet bends over said mid-field section.

9. An apparatus for bending a glass sheet comprising:
   a heating furnace;
   a mould for supporting a glass sheet in said heating furnace;
   an array of elongated electric resistance heating elements;
   said array including a first half-field and a second half-field wherein a longitudinal direction of heating elements in said first half-field is disposed at an acute angle with a longitudinal direction of heating elements in said second half-field; and,
   each of said resistance heating elements being switchable between an on and off condition according to a predetermined program.

10. An apparatus as set forth in claim 9, including means for monitoring a temperature of said glass sheet, said means for monitoring being linked with program logic circuit means for controlling said energy flux distribution of said heating field.

11. An apparatus as set forth in claim 9, including,
a mould carriage movable into and out of said furnace, said mould carriage including an upwardly and downwardly movable floor;
monitoring windows and lighting mounted on said furnace so as to allow visual monitoring of the bending of said glass sheet;
a switchboard having manually operable switches for switching each of said resistance elements between said on and off condition; and,
a computer having memory means for recording an on and off statue of said manually operable switches during various stages of a heating and bending operation such that an energy flux distribution obtained manually for said heating and bending operation may be reproduced automatically by a program.

12. An apparatus as set forth in claim 9, wherein the number of elongated resistance elements in said array exceeds 200.

13. An apparatus as set forth in claim 9, including;
cooling gates disposed in a roof of said furnace, said cooling gates being movable between an open and closed position; and,
cooling-air fans disposed in a lower section of said furnace.

14. An apparatus for bending a glass sheet comprising:
a heating furnace;
a mould for supporting a glass sheet in said heating furnace;
an array of heating elements for generating a heating field, said heating field being adjustable so as to provide a desired energy flux distribution over said heating field;
means for moving said mould away from said heating field of said array of heating elements.

15. An apparatus as set forth in claim 14, including means for monitoring a temperature of said glass sheet, said means for monitoring being linked with program logic circuit means for controlling said energy flux distribution of said heating field.

16. An apparatus as set forth in claim 14, including,
a mould carriage movable into and out of said furnace, said mould carriage including an upwardly and downwardly movable floor;
monitoring windows and lighting mounted on said furnace so as to allow visual monitoring of the bending of said glass sheet;
a switchboard having manually operable switches for switching each of said resistance elements between said on and off condition; and,
a computer having memory means for recording an on and off statue of said manually operable switches during various stages of a heating and bending operation such that an energy flux distribution obtained manually for said heating and bending operation may be reproduced automatically by a program.

17. An apparatus as set forth in claim 14, including;
cooling gates disposed in a roof of said furnace, said cooling gates being movable between an open and closed position; and,
cooling-air fans disposed in a lower section of said furnace.

* * * * *